United States Patent [19]

Hofer

[11] 4,104,916

[45] Aug. 8, 1978

[54] APPARATUS FOR TEMPERATURE MEASUREMENT

[76] Inventor: Heinz P. Hofer, South Blvd., Upper Grand View, N.Y. 10960

[21] Appl. No.: 720,944

[22] Filed: Sep. 7, 1976

[51] Int. Cl.² ............................................. G01K 3/00
[52] U.S. Cl. .................................................. 73/343 B
[58] Field of Search ................... 73/343 B, 352, 363.9; 116/129 T, DIG. 41, DIG. 46; 206/306

[56] References Cited

U.S. PATENT DOCUMENTS

| | | | |
|---|---|---|---|
| 2,179,158 | 11/1939 | Marks | 73/353 B X |
| 2,387,586 | 10/1945 | Humphreys | 116/DIG. 41 X |
| 2,826,071 | 3/1958 | Weksler | 73/352 |
| 3,009,217 | 11/1961 | Weiner | 73/343 B X |
| 3,124,003 | 3/1964 | Gorgens | 73/363.9 |
| 3,864,976 | 2/1975 | Parker | 73/343 B X |

*Primary Examiner*—Anthony V. Ciarlante
*Attorney, Agent, or Firm*—Amster, Rothstein & Engelberg

[57] ABSTRACT

A device for measuring the temperature of an open bottle of wine which combines a thermometer and a protective container for storage of the thermometer. The container top is designed to receive the thermometer indicator head and is further adapted to be used with the thermometer to seal the bottle opening when the thermometer is in use. The thermometer's temperature indicator scale is divided into color coded segments, each segment the color of wine that should be served at temperatures within the range corresponding to the segment.

3 Claims, 4 Drawing Figures

APPARATUS FOR TEMPERATURE MEASUREMENT

This invention relates generally to thermometers, and in particular, to an apparatus for measuring the temperature of bottled liquids, such as wine.

Various types of thermometers are known in the prior art. One common variety includes a hollow temperature sensing stem depending from a generally cylindrical hollow indicator head. Inside the stem, there is a rotatably mounted, concentric shaft which extends upward into the indicator head; and a temperature sensitive motive element is arranged to change the rotational orientation of the shaft with changes in temperature. A pointer is mounted perpendicularly at the end of the shaft that extends into the interior of the indicator head and rotates along with the shaft. On the interior of the indicator head, and below the pointer, there is provided a circular scale member; and the upper indicator surface is made transparent so that a user can look through the top of the indicator head and, by the orientation of the pointer, determine the temperature that the thermometer is reading. It is also known that the various segments of a circular scale can be coded with different colors to facilitate reading temperature ranges.

Further, as disclosed in U.S. Pat. No. 3,124,003, issued to J. E. Gorgens on Mar. 10, 1964, a small thermometer of the type described can be provided with a tubular case that fits over and protects the temperature sensing stem; and a clip can be provided on the case so that the entire unit may be carried in the pocket of a garment.

Although thermometers of the type described exist in the prior art, they possess a number of disadvantages undesirable in such devices. One such disadvantage is that the thermometer cannot be conveniently rested on a surface between uses, because it tends to roll along flat surfaces when placed on its side. When placed on its head with the stem pointing up, the thermometer is also unstable, because the transparent top surface is usually slightly convex so that the thermometer may accidentally be knocked over. Also, in this position the stem is particularly susceptible to damage. If the thermometer is rested on a counter top or other relatively high surface, its instability presents the immediate danger that it will fall from the counter top to the floor and be damaged or broken. The provision of a thermometer stem casing with a pocket clip, as disclosed in the Gorgens patent, still does not permit the thermometer to be rested on a surface. In addition, although carrying the thermometer in a garment pocket may be a satisfactory solution for small thermometers, this proves inconvenient and wholly inadequate for thermometers with long stems, such as those used to measure the temperature of wine inside a bottle.

In addition to the foregoing, disadvantages are encountered with existing devices in measuring the temperature of wine inside a bottle. Typically, such measurements would be taken at the dinner table immediately prior to serving the wine. Under such circumstances, an opened wine bottle might be stored in a wine server with the neck of the bottle somewhat raised above the bottom thereof. In the process of inserting the stem of the thermometer into the neck of the wine bottle to measure the temperature of the wine, some wine is often spilled, leaving an unsightly stain on the table cloth and wasting some of the costly fluid. Measuring the temperature of effervescent wines, such as champagne, is even more troublesome. Such wines are usually served chilled, and if it is desired to serve them at the correct temperature, several measurements must be taken, because the thermometer must be removed and the bottle re-closed after each measurement to prevent excessive loss of the effervescence. Thus, each time the temperature of the wine is measured, the bottle must be opened, the thermometer stem must be inserted to measure the temperature of the wine, and the bottle must be re-closed after the temperature measurement. It is not only inconvenient, but time-consuming to repeat this temperature-measuring sequence several times for a single bottle of wine.

The average wine drinker encounters an additional problem in measuring the temperature of bottled wine. Even if he overcomes the foregoing difficulties, he still does not now the correct temperature at which to serve his wine, without consulting some reference source.

Broadly, it is an object of the present invention to provide a temperature-measuring apparatus which eliminates one or more of the disadvantages in existing devices. Specifically, it is within the contemplation of the present invention to measure the temperature of wine inside a bottle without encountering the aforesaid disadvantages.

It is a further object of this invention to provide a container for a thermometer of the type described which protects the thermometer against damage and permits the thermometer to be stably stored on a surface between uses.

It is another object of this invention to provide a device for measuring the temperature of a bottled liquid, which device prevents spillage of the liquid during temperature measurement.

It is yet another object of this invention to provide a device for measuring the temperature of bottled effervescent wines, which device does not require repeated measurements and bottle closings to prevent loss of effervescence.

It is a further object of this invention to provide a device which will permit a user to bring wine to the correct serving temperature without consulting a reference source for the correct temperature.

It is also an object of this invention to provide a device for measuring temperature which is reliable, efficient and convenient in use, yet simple and economical in construction.

In accordance with the illustrative embodiment demonstrating objects and features of the present invention, a device for measuring the temperature of bottled wine is provided, which device combines a thermometer of the type described and a protective container for stably storing the thermometer on a surface. The container includes a hollow base having a bottom adapted to rest on a surface and an open top. In addition, a cover is provided which fits over the open top of the base and cooperates with the base to define a closed chamber for storing the thermometer stem. The cover has a top wall which is formed to receive the bottom of the thermometer indicator head and which has a central aperture to permit the thermometer stem to extend downward into the thermometer stem storing chamber. At the point where the thermometer stem extends downward, a short thick sleeve depends from the top wall and surrounds the upper portion of the stem. The circular scale inside the indicator head is divided into color coded segments, such that each segment on the scale is coded with the color of wine that should be served at a temperature in the range represented by the segment. This color coding is carried onto the outer surface of the container, whereon there are also printed the names of particular varieties of wine in each segment. In use, the cover and thermometer are lifted from the base as a unit, and the stem is inserted into a wine bottle with the sleeve closing off the mouth of the bottle to prevent spillage and inhibit loss of effervescence. The correct temperature of the wine is reached when the pointer on the thermometer points to the segment which matches the color of the wine.

The above brief description, as well as further objects, features and advantages of the present invention will be more fully appreciated by reference to the following detailed description of a presently preferred, but nonetheless illustrative, embodiment in accordance with the invention, with reference being had to the accompanying drawings wherein.

Figure 1:
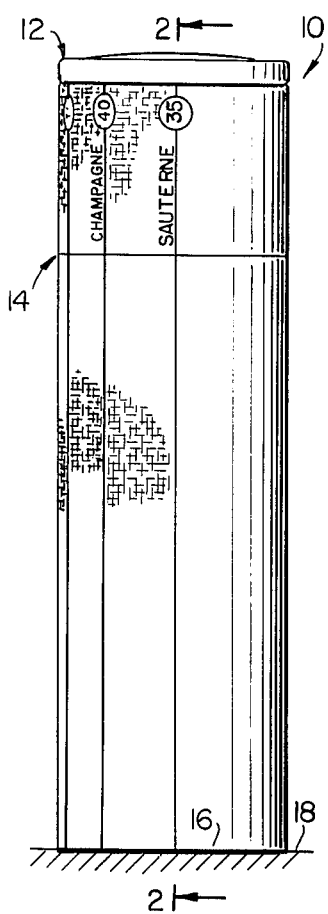
FIG. 1 is an elevational view of a device for measuring the temperature of wine in accordance with the invention, the device being shown resting on a surface with the thermometer stored in the container.

Referring now to the details of the drawings, and in particular to FIG. 1, there is shown an apparatus 10 for measuring the temperature of bottled wine which embodies objects and features of the present invention. The apparatus 10 broadly comprises a thermometer 12 and a generally cylindrical container 14 in which the thermometer is stored. The container 14 has a flat bottom 16, and can therefore be placed on a flat surface 18 to stably store the thermometer 12 above the surface 18.

Figure 2:
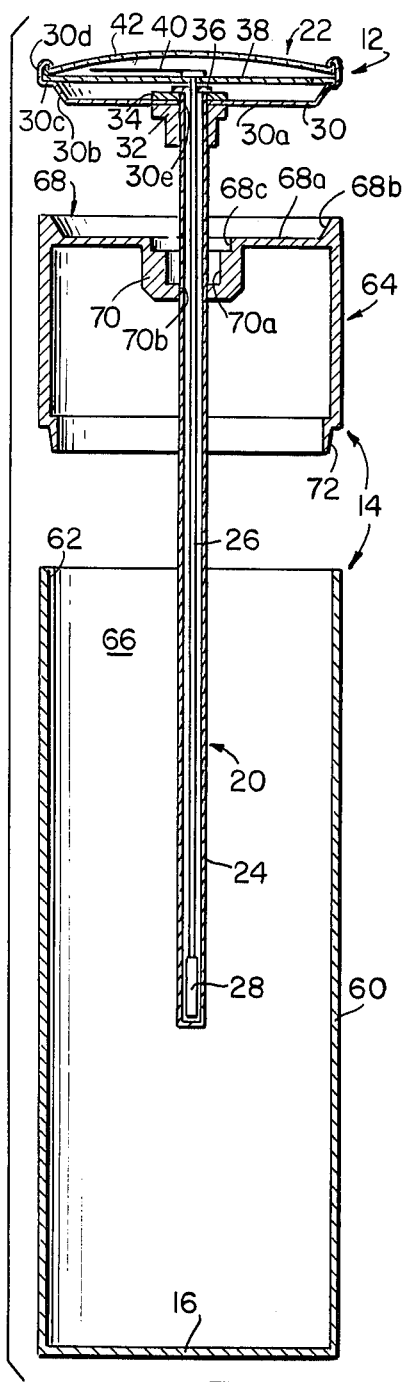
FIG. 2 is an exploded sectional view, on an enlarged scale, taken along line 2—2 in FIG. 1 and showing the components of the temperature-measuring device as well as the details of internal construction thereof.

As best seen in FIG. 2, the thermometer 12 broadly comprises a stem assembly 20 and a temperature indicator head 22 secured near the top of the stem assembly 20.

The stem assembly 20 includes the hollow stem 24 which is made of a heat conductive material, such as steel. Inside stem 24, a slender shaft 26 is mounted for axial rotation, and a heat-sensitive motive element 28, such as a bi-metallic spring, is coupled between stem 24 and shaft 26 to change the rotational orientation of shaft 25 as the temperature of element 28 changes. Shaft 26 extends upward, out of stem 24 and into the interior of indicator head 22.

The housing 30 forms an enclosure for the internal components of indicator head 22. The housing 30, preferably made of sheet metal, includes a lower wall 30a, a conical portion 30b, a substantially horizontal seat portion 30c and a generally vertical wall 30d. The housing 30 also includes an aperture 30e disposed in the center of bottom wall 30a, which aperture is dimensioned to receive the upper end of stem 24. Housing 30 is secured to the top of stem 24 by being sandwiched between the cylindrical fastening members 32, 34 which are mounted on and secured near the top of stem 24 on either side of bottom wall 30a. On top of fastening member 34, there is secured a disc-shaped member 36 which includes a central aperture wherein the upper portion of shaft 26 is journaled. A circular scale member 38, described more fully hereinafter, is received on the seat 30c formed in housing 30, and includes a central aperture therein through which the upper end of shaft 26 passes. At the upper end of shaft 26, a pointer 40 is securely mounted perpendicularly thereto, so that pointer 40 rotates with shaft 26. Indicator head 22 is closed by placing a circular, convex, transparent member 42 over scale member 38, so that member 42 is supported on member 38 at its radially outermost extreme. To secure member 42 in place, the upper end of portion 30d of housing 30 is crimped down over member 42.

Figure 4:
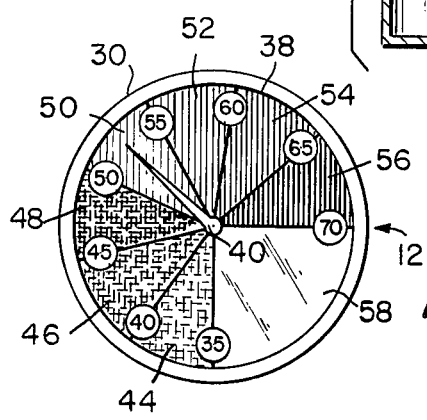
FIG. 4 is a top-plan view of the thermometer and shows the color coding of the scale thereof.

Referring now to FIG. 4, it will be observed that scale member 38 is marked with temperature indicia ranging from 35° to 70° F. in 5° increments. The segments of member 38 lying between adjacent indicia are color coded, so that progressing clockwise from segment 44 to segment 48, coding is with progressively darker shades of yellow, and progressing clockwise from segment 50 to segment 56, the color coding is from a shade of pink to a deep red hue. Segment 58 is not used in the illustrative embodiment. The color coding of the segments of member 38 corresponds to different colors of wine, with segments 44, 46, 48 corresponding to progressively darker shades of white wine, and segments 50, 52, 54, 56 progressing from rose to the deepest shades of red wine.

The container 14 includes a cylindrical base with a flat bottom 16 and an open top 62, and has a generally cylindrical cover 64 which is designed to fit on and close the top of base 60 and to cooperate therewith to define a closed chamber 66 for receiving and housing the stem assembly 20. Both base 60 and cover 64 are conveniently made of plastic. As best seen in FIG. 1, the color reading from scale member 38 is carried on to the external surfaces of base 60 and cover 64. In addition, cover 64 has printed in each color coded segment the names of specific varieties of wines that should be served at a temperature in that segment.

As best seen in FIG. 2, cover 64 includes a top wall 68 which is formed to receive thermometer 12. Top wall 68 includes a conical bore 68b, a recessed portion 68a, and a central bore 68c which is shaped to receive mounting member 32. Depending from the center of top wall 68, there is a cylndrical knob 70 which includes a bore 70a dimensioned to receive the bottom portion of mounting member 32 and which has a central aperture dimensioned to receive stem 24. When thermometer 12 is mounted on cover 64, portion 30c of housng 30 engages the top of top wall 68 and portions 30a and 30b of housing 30 engage portions 68a and 68b of top wall 68, respectively. Mounting member 32 is received with a snug fit in bores 68c and 70a of cover 64, and stem 24 extends downward through aperture 70b. The snug fit of mounting member 32 in bores 68c and 70a of cover 64 assures that the thermometer 12 and cover 64 will not separate during normal use. At its lower extreme, cover 64 includes a radially recessed flange 72 which is received inside base 60 when cover 64 is mounted thereon. This flange 72 prevents lateral movement between cover 64 and base 60 when the two are assembled.

Figure 3:
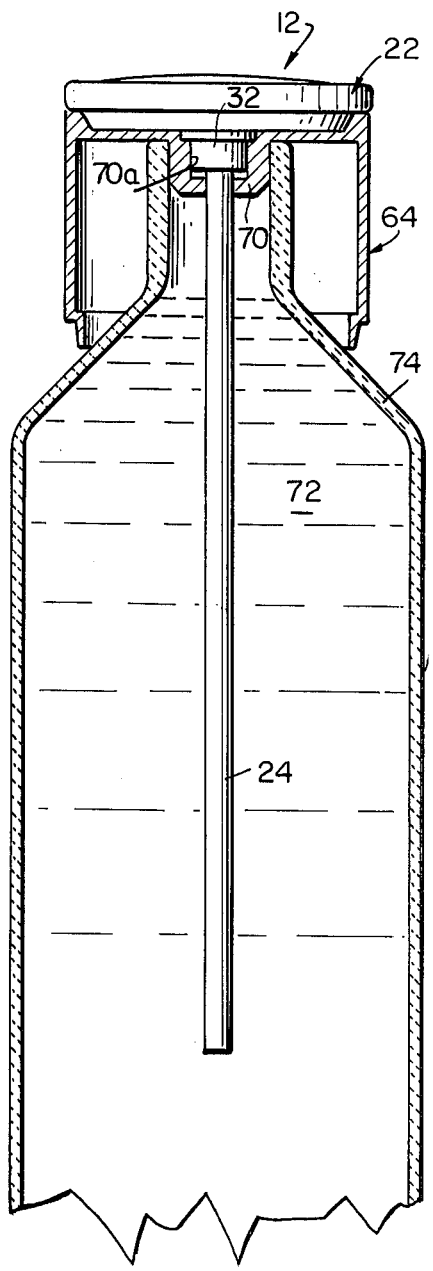
FIG. 3 is a sectional view showing the thermometer and container cover of the temperature-measuring device mounted on a wine bottle for measuring the temperature of the wine therein.

In use, the assembly comprising thermometer 12 and cover 64 is removed from base 60 as a unit. To measure the temperature of wine 72 in a bottle 74, stem 24 is inserted into the mouth of the bottle, and cover 64 is moved downward to submerge the lower portion of stem 24 in the wine. In the process, knob 70 is inserted into and closes off the mouth of the wine bottle (see FIG. 3). With cover 64 in this position, spillage of the wine is prevented, and the escape of gases is inhibited, so that effervescent wines will not become flat. In addition, the color-coded bands on the periphery of cover 64 extend downward in close proximity to the wine bottle so that the band corresponding to the color of the wine is readily located. Having determined the color band that corresponds to his wine, all the user need do is chill the wine or permit it to stand until the pointer 40 points to the color band selected.

The color matching method is a good, general procedure for bringing wine to the correct temperature. However, if the user desires more precise results, he need merely locate the name of his wine on the periphery of cover 64 and bring his wine to the temperature of the corresponding color band.

Although a specific embodiment of the invention has been disclosed for illustrative purposes, it will be appreciated by one skilled in the art that many additions, substitutions and modifications are possible without departing from the scope and spirit of the invention as defined by the accompanying claims. For example, it will be appreciated that the outside of knob 70 could be covered with a soft material so that it could be inserted into bottle necks of various diameters and still effectively close off the mouth of the bottle.

What is claimed is:

1. A temperature measuring instrument for measuring the temperature of the contents of a bottle of wine comprising a thermometer including a hollow stem having an upper and lower end, a temperature sensing means positioned within said stem proximate the lower end thereof, and a temperature-indicating head secured proximate the upper end of said stem and having a calibrated scale and a pointer, said calibrated scale including a plurality of colored segments, the color of each segment being chosen to correspond to the color of a wine and the segments being arranged on said temperature-indicating head in a manner such that the segment indicated by said pointer corresponds to the proper temperature when the color of said wine in said bottle is the same as the color indicated by said pointer, said pointer coupled with said sensing means for indicating the temperature sensed thereby, and a thermometer storing container including a hollow base having a bottom adapted to rest on a supporting surface and an open top and a cover having depending side walls constructed and arranged to fit on and close the open top of said base and cooperating therewith to define a closed chamber for storing said thermometer stem, said cover also having a top wall formed to receive said temperature indicating head, said top wall having a cylindrical sleeve depending from said top wall having an outside diameter selected to engage and seal the inner surface of the open end of said bottle, said sleeve having an aperture therein dimensioned to engage said stem, said engagement between said stem and said sleeve providing an air-tight seal between said top wall and said thermometer stem, the temperature of the liquid in the bottle being measured by removing said thermometer and said cover from said base and inserting the lower end of said stem into said bottle so that said sleeve enters and closes said bottle opening, thus providing a fully sealed chamber for the continued storage and measurement of the contents of said bottle of wine.

2. The temperature measuring instrument of claim 1 in which the colors of said colored segments are extended down the exterior sides of said storage container.

3. A thermometer for determining when wine in a bottle is at the correct serving temperature comprising a hollow stem having an upper and lower end, a temperature sensing means positioned within said stem proximate the lower end thereof and a temperature-indicating head secured proximate the upper end of said stem and having a calibrated scale and a pointer, said pointer coupled with said sensing means for indicating the temperature sensed thereby, said calibrated scale including a plurality of colored segments, the color of each segment being chosen to correspond to the color of wine, the segments being arranged on said temperature-indicating head in a manner such that the segment indicated by said pointer corresponds to the correct serving temperature when the color of said wine is the same as the color indicated by said pointer.

* * * * *